US007512536B2

(12) United States Patent
Mansour

(10) Patent No.: US 7,512,536 B2
(45) Date of Patent: Mar. 31, 2009

(54) EFFICIENT FILTER BANK COMPUTATION FOR AUDIO CODING

(75) Inventor: Mohamed F. Mansour, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 673 days.

(21) Appl. No.: 11/120,365

(22) Filed: May 2, 2005

(65) Prior Publication Data

US 2005/0256723 A1 Nov. 17, 2005

Related U.S. Application Data

(60) Provisional application No. 60/571,232, filed on May 14, 2004.

(51) Int. Cl.

| | |
|---|---|
| ***G10L 19/02*** | (2006.01) |
| ***G10L 13/00*** | (2006.01) |
| ***G10L 19/06*** | (2006.01) |
| *H04B 1/20* | (2006.01) |
| *H04B 1/16* | (2006.01) |
| *H04B 1/46* | (2006.01) |

(52) U.S. Cl. .................... 704/268; 704/200; 704/200.1; 704/201; 369/4; 369/14

(58) Field of Classification Search ......... 704/200–201, 704/203–204, 206, 231, 268–269, 500–504; 725/143–145; 369/1–2, 4, 14–17

See application file for complete search history.

(56) References Cited

U.S. PATENT DOCUMENTS 5,451,954 A * 9/1995 Davis et al. ................. 341/200
5,852,806 A * 12/1998 Johnston et al. ............. 704/500
5,956,674 A * 9/1999 Smyth et al. ............. 704/200.1
5,970,440 A * 10/1999 Veldhuis et al. ............. 704/203
6,104,996 A * 8/2000 Yin ............................ 704/500
6,226,608 B1 * 5/2001 Fielder et al. ............... 704/229
6,321,200 B1 * 11/2001 Casey ......................... 704/500
6,363,338 B1 * 3/2002 Ubale et al. .............. 704/200.1
6,404,925 B1 * 6/2002 Foote et al. ................. 382/224
6,587,590 B1 * 7/2003 Pan ............................ 382/250
6,636,830 B1 * 10/2003 Princen et al. .............. 704/204
6,671,666 B1 * 12/2003 Ponting et al. .............. 704/233
7,089,182 B2 * 8/2006 Souilmi et al. .............. 704/234
7,336,719 B2 * 2/2008 Gore et al. .................. 375/267
2002/0165712 A1 * 11/2002 Souilmi et al. .............. 704/233

(Continued)

OTHER PUBLICATIONS

Aas et al., 1996, "Minimum Mean-Squared Error Transform Coding and Subband Coding", IEEE Transactions on Information Theory, vol. 42, pp. 1179-1192.*

(Continued)

*Primary Examiner*—Talivaldis Ivars Smits
*Assistant Examiner*—David Kovacek
(74) *Attorney, Agent, or Firm*—Mirna Abyad; Wade J. Brady III; Frederick J. Telecky, Jr.

(57) ABSTRACT

Low-complexity synthesis filter bank for MPEG audio decoding uses a factoring of the 64×32 matrixing for the inverse-quantized subband coefficients. Factoring into non-standard 4-point discrete cosine and sine transforms, point-wise multiplications and combinations, and non-standard 8-point discrete cosine and sine transforms limits memory requirements and computational complexity.

9 Claims, 3 Drawing Sheets

U.S. PATENT DOCUMENTS

| | | | | |
|---|---|---|---|---|
| 2003/0122942 | A1 * | 7/2003 | Parker et al. | 348/231.3 |
| 2003/0187528 | A1 * | 10/2003 | Chu et al. | 700/94 |
| 2003/0187663 | A1 * | 10/2003 | Truman et al. | 704/500 |
| 2004/0044533 | A1 * | 3/2004 | Najaf-Zadeh et al. | 704/500 |
| 2004/0086038 | A1 * | 5/2004 | Kilbank | 375/240 |
| 2007/0093206 | A1 * | 4/2007 | Desai et al. | 455/41.2 |
| 2007/0208560 | A1 * | 9/2007 | Rigazio et al. | 704/227 |

OTHER PUBLICATIONS

Chen et al., 1998, "Fast time-frequency transform algorithms and their applications to real-time software implementation of AC-3 audio codec", IEEE Transactions on Consumer Electronics, vol. 44, pp. 413-423.*

Huang et al., 2000, "A multi-input-multi-output system approach for the computation of discrete fractional Fourier transform", Signal Processing, vol. 80, pp. 1501-1513.*

Cho et al., 2000, "Warped Discrte Cosine Transform and Its Application in Image Compression", IEEE Transactions on Circuits and Systems for Video Technology, vol. 10, pp. 1364-1373.*

Agaian et al., 2004, "The Fast Parameteric Slantlet Transform with Applications", Image Processing: Algorithms and Systems III, SPIE-IS&T, vol. 5298, pp. 01-12.*

* cited by examiner

EFFICIENT FILTER BANK COMPUTATION FOR AUDIO CODING

CROSS-REFERENCE TO RELATED APPLICATIONS

This application claims priority from provisional application No. 60/571,232, filed May 14, 2004.

BACKGROUND OF THE INVENTION

The present invention relates to digital signal processing, and more particularly to Fourier-type transforms.

Processing of digital video and audio signals often includes transformation of the signals to a frequency domain. Indeed, digital video and digital image coding standards such as MPEG and JPEG partition a picture into blocks and then (after motion compensation) transform the blocks to a spatial frequency domain (and quantization) which allows for removal of spatial redundancies. These standards use the two-dimensional discrete cosine transform (DCT) on 8×8 pixel blocks. Analogously, MPEG audio coding standards such as Levels I, II, and III (MP3) apply an analysis filter bank to incoming digital audio samples and within each of the resulting 32 subbands quantize based on psychoacoustic processing; see FIG. 3*a*. FIGS. 3*b*-3*c* show the decoding including inverse quantization and a synthesis filter bank.

Pan, A Tutorial on MPEG/Audio, 2 IEEE Multimedia 60 (1995) describes the MPEG/audio Layers I, II, and III coding. Konstantinides, Fast Subband Filtering in MPEG Audio Coding, 1 IEEE Signal Processing Letters 26 (1994) and Chan et al, Fast Implementation of MPEG Audio Coder Using Recursive Formula with Fast Discrete Cosine Transforms, 4 IEEE Transactions on Speech and Audio Processing 144 (1996) both disclose reduced computational complexity implementations of the filter banks in MPEG audio coding.

However, these known methods have high memory demands for their low- complexity computations.

SUMMARY OF THE INVENTION

The present invention provides MPEG audio computations with both low memory demands and low complexity by factoring the matrixing of the synthesis filter bank.

DESCRIPTION OF THE PREFERRED EMBODIMENTS

1. Overview

Figure 1:
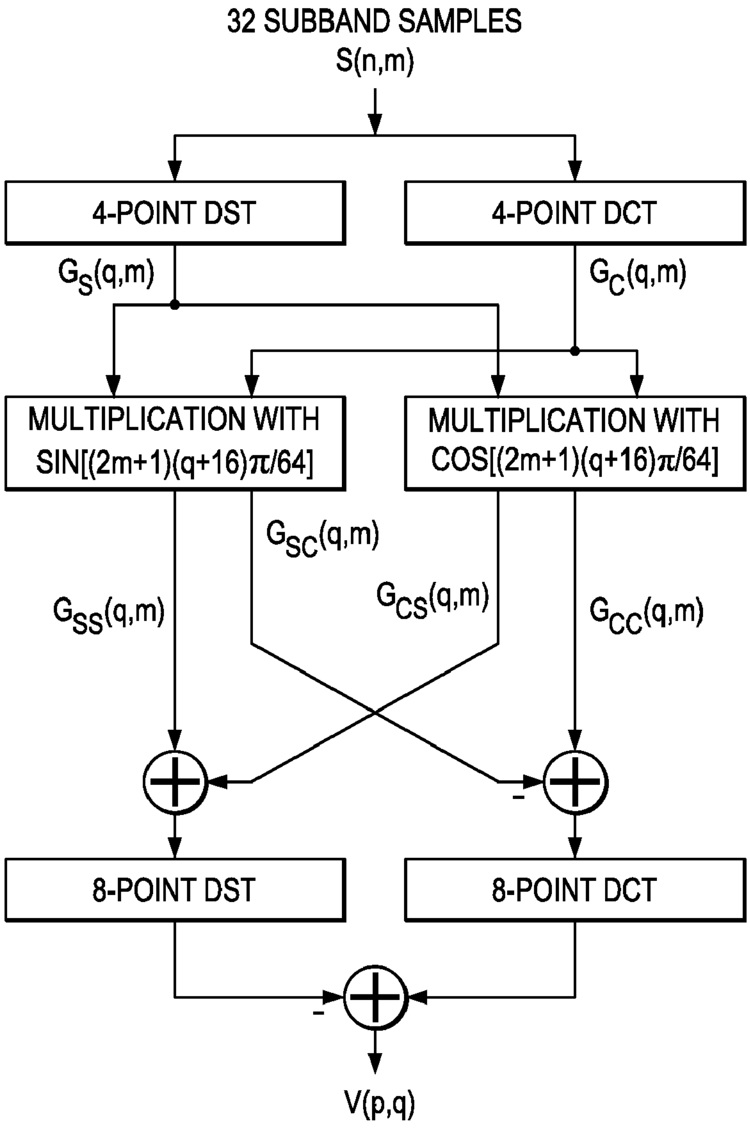
FIG. 1 is a flow diagram.

Preferred embodiment methods include synthesis filter bank computations with factored DCT matrixing; see FIG. 1 illustrating the case of a filter bank for 32 subbands as in MPEG audio Layers I-III. This factoring allows for smaller memory requirements together with lower complexity computations.

Figure 4:
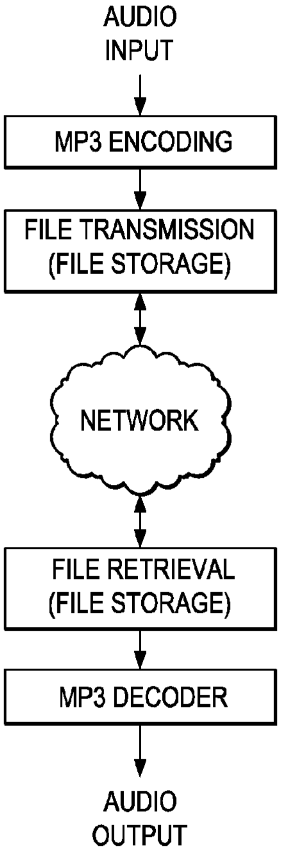
FIG. 4 illustrates a system.

Preferred embodiment systems perform preferred embodiment methods with any of several types of hardware: digital signal processors (DSPs), general purpose programmable processors, application specific circuits, or systems on a chip (SoC) which may have multiple processors such as combinations of DSPs, RISC processors, plus various specialized programmable accelerators such as for FFTs and variable length coding (VLC). A stored program in an onboard or external (flash EEP) ROM or FRAM could implement the signal processing. Analog-to-digital converters and digital-to-analog converters can provide coupling to the real world, modulators and demodulators (plus antennas for air interfaces) can provide coupling for transmission waveforms, and packetizers can provide formats for transmission over networks such as the Internet; see FIG. 4.

2. Synthesis Filter Bank Matrixing

Figure 3A:
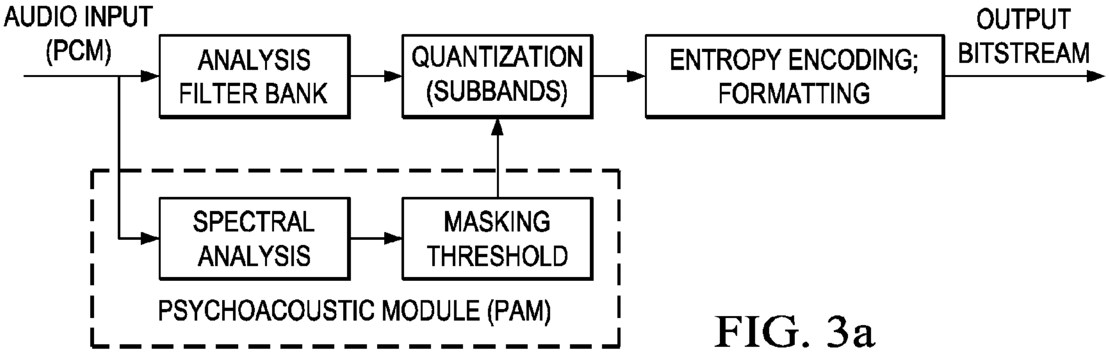
FIG. 3a (PRIOR ART)
FIGS. 3*a*-3*c* show MPEG audio encoding and decoding.
Figure 3B:
FIG. 3b (PRIOR ART)

FIGS. 3*a*-3*b* illustrate the functional blocks of encoding and decoding in MPEG audio Layers I, II, and III. The analysis filter bank filters an incoming stream of 16-bit PCM audio samples into 32 frequency subbands of equal bandwidth plus performs critical downsampling by a factor of 32; the incoming data sampling rate for audio typically is one of 32 KHz, 44.1 KHz, or 48 KHz. The impulse response of the kth subband filter, $h_k(n)$, is just a prototype lowpass filter impulse response, h(n), shifted to the kth subband:

$$h_k(n)=h(n)\cos[(2k+1)(n-16)\pi/64]$$

The prototype h(n) has 512 taps.

Quantization applies in each subband and to groups of 12 or 36 subband samples; the quantization relies upon psychoacoustic analysis in each subband. Indeed, in human perception strong sounds will mask weaker sounds within the same critical frequency band; and thus the weaker sounds may become imperceptible and be absorbed into the quantization noise.

Decoding includes inverse quantization plus a synthesis filter bank to reconstruct the audio samples. The preferred embodiment methods lower the memory requirements plus also lower the computational complexity of the synthesis filter bank.

Initially, consider the analysis filter bank which filters an input audio sample sequence, x(t), into 32 subband sample sequences, $S_k(t)$ for k=0, 1, . . . , 31. Each subband sequence is then (critically) downsampled by a factor of 32. That is, at each time which is a multiple of 32 input sample intervals, the analysis filter bank provides 32 downsampled outputs:

$$S_k(t)=\Sigma_{0\leqq n\leqq 511}x(t-n)h_k(n) \text{ for } k=0, 1, \ldots, 31.$$

This can be rewritten using the $h_k(n)$ definitions and then the summation decomposed into iterated smaller sums by a change of summation index. In particular, let n=64p+q where p=0, 1, . . . , 7 and q=0, 1, . . . , 63:

$$\begin{aligned} S_k(t) &= \sum_{0\leq n\leq 511} x(t-n)h(n)\cos[(2k+1)(n-16)\pi/64] \\ &= \sum_{0\leq q\leq 63} \cos[(2k+1)(q-16)\pi/64] \\ &\quad \sum_{0\leq p\leq 7} x(t-64p-q)(-1)^p h(64p+q) \end{aligned}$$

where the cosine periodicity, $\cos[A+\pi m]=(-1)^m\cos[A]$, and $(-1)^{(2k+1)p}=(-1)^p$ were used. Next, define the modified impulse response (window) c(n) for n=0, 1, . . . , 511 as $c(64p+q)=(-1)^p\,h(64p+q)$. Hence, the filter bank has the form:

$$S_k(t)=\Sigma_{0\leqq q\leqq 63}\cos[(2k+1)(q-16)\pi/64]\Sigma_{0\leqq p\leqq 7}x(t-64p-q)c(64p+q)$$

In effect, the summation in the x(t−n) $h_k(n)$ convolution has been simplified by use of the periodicity common to all of the subband cosines; note that the range of p depends upon the size of h(n), whereas the range of q is twice the number of subbands which determines the cosine arguments.

This can be implemented as follows using groups of 32 incoming audio samples. At time t=32u, shift the uth group of 32 samples, {x(t), x(t−1), x(t−2), . . . , x(t−31)}, into a 512-sample FIFO which will then contain samples x(t−n) for n=0, 1, . . . , 511. Next, pointwise multiply the 512 samples with the modified window, c(n), to yield z(n)=c(n) x(t−n) for n=0, 1, . . . , 511. Then shift and add (stack and add) to perform the inner summation common to all subbands to give the time aliased signal: $y(q)=\Sigma_{0\leqq p\leqq 7}\ z(64p+q)$ for q=0, 1, . . . , 63. Lastly, compute 32 output samples (one for each subband) by matrixing:

$$S_k(t)=\Sigma 0\leqq q\leqq 63\ M_{k,q}y(q) \text{ for } k=0, 1, \ldots, 31.$$

where the matrix elements are $M_{k,q}=\cos[(2k+1)(q-16)\pi/64]$

The psychoacoustic analysis and quantization applies to groups of 12 or 36 samples in each subband. For example, psychoacoustic model 1 in Layer I applies to frames of 384 (=32×12) input audio samples from which the analysis filter bank gives a group of 12 $S_k$'s for each of the subbands. In contrast, Layers II and III use frames of 1152 (=32*36) input audio samples and thus quantize with sequences of 36 $S_k$'s for each subband. Layer III includes a 6-point or 18-point MDCT transform with 50% window overlap for the 36 $S_k$'s to give better frequency resolution; that is, Layer III quantizes MDCT coefficients of a subband rather than the subband samples. The quantization uses both a scale factor plus a lookup table and allocates available bits to subbands according to their mask-to-noise ratios where the noise is quantization noise.

Figure 3C:
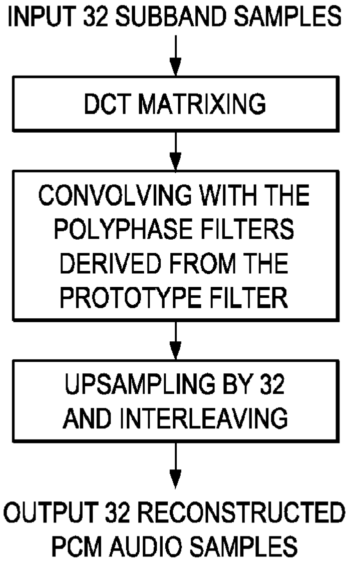
FIG. 3c (PRIOR ART)

Decoding reverses the encoding and includes inverse quantization and inverse (synthesis) filter bank filtering. Additionally, Layer III requires an inverse MDCT after the inverse quantization but before the synthesis filter bank. The synthesis filter bank is essentially the inverse of the analysis filter bank: first a synthesis matrixing, then upsampling, filtering, and combining; FIG. 3*c* illustrates a polyphase implementation. The synthesis matrixing converts the 32-vector $S_0$, $S_1$, . . . , $S_{31}$ of inverse-quantized subband samples into a 64-vector $V_0$, $V_1$, . . . , $V_{63}$ by a 64×32 matrix multiplication:

$$V_i=\Sigma_{0\leqq k\leqq\_}N_{i,k}S_k \text{ for } i=0, 1, \ldots, 63.$$

where the matrix elements are $N_{i,k}=\cos[(i+16)(2k+1)\pi/64]$.

For each vector component, filter (convolution with the synthesis filter impulse response) and interleave the results (polyphase interpolation) to reconstruct x(n)

The synthesis filter bank can also be implemented with an overlap-add structure using a length-512 shift register as follows. First, extend the 64-vector $V_i$ to 512 components in a buffer by periodic replication; namely, take $v(t-64p-i)=V_i$ for i=0, 1, . . . , 63 and p=0, 1, . . . , 7. Next, pointwise multiply by the modified prototype synthesis window to get $v(t-64p-i)(-1)^p f(64p+i)$ where f(n) is the prototype synthesis window (impulse response) related to h(n). (That is, h(n) and f(n) satisfy $\Sigma_{-\infty<m<\infty}f(n-32m)\,h(32m-n+32k)=1$ if k=0 and =0 if k≠0.) Then accumulate the product in the length-512 shift register which contains sums of shifted products of prior blocks. Lastly, shift out a block of 32 reconstructed x(n)s and shift in 32 0s.

3. Preferred Embodiment Matrixing Factorization

The first preferred embodiment synthesis filter bank implementation factors the 64×32 matrix $N_{i,k}$ and thereby reduces both memory demands and computational complexity of the matrixing operation. FIG. 1 illustrates the preferred embodiment which decomposes the matrixing summation into iterated shorter sums and thereby allows computation as two simpler stages with smaller memory requirements. For clarity, first change notation by converting the subscripts to arguments in parenthesis. Thus the synthesis filter bank matrixing becomes:

$$V(i)=\Sigma_{0\leqq k\leqq 31}N(i,k)S(k) \text{ for } i=0, 1, \ldots, 63$$

where the matrix elements are N(i,k)=cos[(2k+1)(i+16)π/64]

Next, change the matrixing summation indices: take i=8p+q with p=0, 1, . . . , 7 and q=0, 1, . . . , 7 plus take k=8n+m with n=0, 1, 2,3 and m=0, 1, . . . , 7.

Thus:

$$\begin{aligned}V(i) &= \sum_{0\leq k\leq 31} N(i,k)S(k) \text{ for } i=0, 1, \ldots, 63\\ &= \sum_{0\leq k\leq 31}\cos[(2k+1)(i+16)\pi/64]S(k)\\ &= \sum_{0\leq m\leq 7}\sum_{0\leq n\leq 3}\cos[(8p+q+16)(16n+2m+1)\pi/64]S(8n+m)\end{aligned}$$

Multiplying out the argument of the cosine gives:

$$\cos[(8p+q+16)(16n+2m+1)\pi/64] = \cos[pn2\pi + p(2m+1)\pi/8 + (q+16)n\pi/4 + (q+16)(2m+1)\pi/64]$$

Applying the cosine addition formula, cos[A+B]=cos[A]cos[B]−sin[A]sin[B], and using the 2π periodicity then gives:

$$\begin{aligned}\cos[(8p+q+16)(16n+2m+1)\pi/64] &=\\ \cos[p(2m+1)\pi/8 + qn\pi/4 + (q+16)(2m+1)\pi/64] &=\\ \cos[qn\pi/4]\cos[(q+16)(2m+1)\pi/64 + p(2m+1)\pi/8] &-\\ \sin[qn\pi/4]\sin[(q+16)(2m+1)\pi/64 + p(2m+1)\pi/8]&\end{aligned}$$

Note that this has isolated the terms in n, and the sums over n in V(i) are analogous to 4-point discrete sine and cosine transforms. Hence, with the notation S(n, m)=S(8n+m), define the transforms:

$$G_c(q, m)=\Sigma_{0\leqq n\leqq 3}\cos[qn\pi/4]S(n, m) \text{ for } q=0, 1, \ldots, 7;\ m=0,1, \ldots, 7$$

$$G_s(q, m)=\Sigma_{0\leqq n\leqq 3}\sin[qn\pi/4]S(n, m) \text{ for } q=0, 1, \ldots, 7;\ m=0,1, \ldots, 7$$

In FIG. 1 these transforms are labeled "4-point DCT" and "4-point DST", respectively, and convert a 4-point input into an 8-point output. Then with the notation V(p, q)=V(8p+q):

$$V(p, q)=\Sigma_{0\leqq n\leqq 7}\cos[(q+16)(2m+1)\pi/64+p(2m+1)\pi/8]\ G_s(q, m)-\Sigma_{0\leqq m\leqq 7}\sin[(q+16)(2m+1)\pi/64+p(2m+1)\pi/8]\ G_s(q, m)$$

Apply the cosine and sine addition formulas to get:

$$V(p, q)=\Sigma_{0\leqq m\leqq 7}\cos[p(2m+1)\pi/8]\ \{G_{cc}(q, m)-G_{ss}(q, m)\}-\Sigma_{0\leqq m\leqq 7}\sin[p(2m+1)\pi/8]\ \{G_{cs}(q, m)+Gsc(q, m)\}$$

where for q=0, 1, . . . , 7 and m=0,1, . . . ,7 the following definitions were used:

$$G_{cc}(q,m)=\cos[(q+16)(2m+1)\pi/64]\,G_c(q,m)$$

$$G_{cs}(q,m)=\sin[(q+16)(2m+1)\pi/64]\,G_c(q,m)$$

$$G_{sc}(q,m)=\cos[(q+16)(2m+1)\pi/64]\,G_s(q,m)$$

$$G_{ss}(q,m)=\sin[(q+16)(2m+1)\pi/64]\,G_s(q,m)$$

Again, the sums in V(p, q) are analogous to 8-point discrete sine and cosine transforms and labeled "8-point DST" and "8-point DCT" in FIG. 1.

The FIG. 1 computations have the following constant memory requirements:

(1) 32 words for $\{\cos[q\pi/4], \sin[qn\pi/4]\}_{n=0:3,\ q=0:7}$; this uses the symmetry between the cosine and sine to reduce the 64 entries in half.

(2) 128 words for $\{\cos[(q+16)(2m+1)\pi/64], \sin[(q+16)(2m+1)\pi/64]\}_{m=0:7,\ q=0:7}$.

(3) 64 words for $\{\cos[p(2m+1)\pi/8], \sin[p(2m+1)\pi/8]\}_{m=0:7,\ p=0:7}$; this uses redundancies to reduce the 128 entries in half.

The total constant memory requirement is 224 words. And the dynamic memory requirement of simultaneously storing both $G_c(q, m)$ and $G_s(q, m)$ is 64 words. Thus the total memory requirement is 296 words. In contrast, the memory requirement in the MPEG standard recommendation is 1088 words.

The FIG. 1 computations have the following computational load:

(1) Computing $G_c(q, m)$ and $G_s(q, m)$ each requires 4 multiply-and-accumulates (MACs), so the total for all 64 (q, m)s is 512 MACs. However, the two transforms are both symmetric, so only 256 MACs are needed.

(2) Computing $\{G_{cc}(q, m)-G_{ss}(q, m)\}$ and $\{G_{cs}(q, m)+G_{sc}(q, m)\}$ each requires 2 MACs, so the total for all (q, m) is 256 MACs.

(3) Computing the two 8-point transforms for V(p, q) takes 16 MACs, so for all (p, q) the total is 1024 MACs. However, only half (512 MACs) is needed due to the symmetry.

The computational load illustrated in FIG. 1 is thus 256+256+512=1024 MACs, which is the same as the MPEG standard recommendation.

However, the FIG. 1 method also has other features; namely, a reduced quantization error variance. In particular, for fixed-point implementations, the variance of the quantization error is linear in the summation order; and this order equals 32 in the MPEG standard representation, but only equals 13 for the FIG. 1 method. This reduced quantization error can be significant in low amplitude segments.

4. Alternative Matrixing

The second preferred embodiment synthesis filter bank includes the matrixing method as in the first preferred embodiment but with simplified computational load and memory requirements for the various DST and DCT transforms.

First consider the 4-point DCT defined as:

$$G_c(q,m)=\Sigma_{0\leq n\leq 3}\cos[qn\pi/4]S(n,m)\text{ for } q=0, 1, \ldots, 7;\ m=0,1,\ldots,7.$$

Initially note that cos[qnπ/4] only has five possible values 0, ±1, or ±1/√2, Indeed, the transform has an 8×4 matrix:

$$\begin{bmatrix} 1 & 1 & 1 & 1 \\ 1 & 1/\sqrt{2} & 0 & -1/\sqrt{2} \\ 1 & 0 & -1 & 0 \\ 1 & -1/\sqrt{2} & 0 & 1/\sqrt{2} \\ 1 & -1 & 1 & -1 \\ 1 & -1/\sqrt{2} & 0 & 1/\sqrt{2} \\ 1 & 0 & -1 & 0 \\ 1 & 1/\sqrt{2} & 0 & -1/\sqrt{2} \end{bmatrix}$$

Figure 2A:
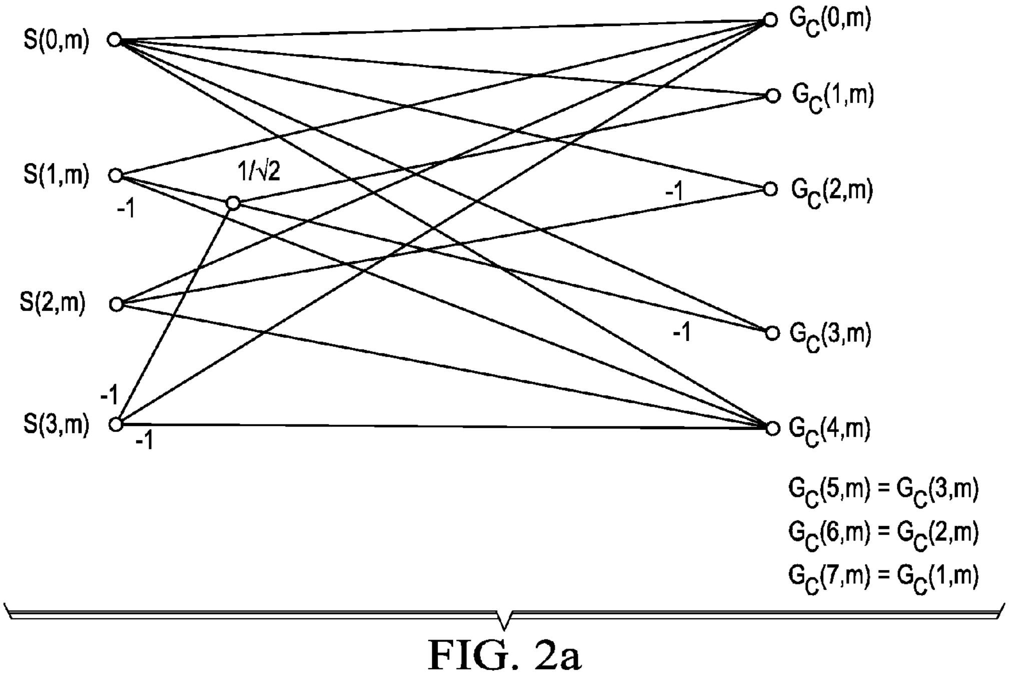
FIGS. 2*a*-2*b* show computations.

If the multiplication by 1/√2 is delayed to after adding/subtracting the corresponding components, then the total computational requirements for $G_c(0,m)$, $G_c(1, m)$, . . . , $G_c(7, m)$ is 11 additions and 1 multiplication. Hence, the total computational requirement of $G_c(q, m)$ for all 64 (q, m) pairs is 88 additions and 8 multiplications. FIG. 2*a* is the butterfly diagram and illustrates the multiplication by 1/√2 after the subtraction which forms the interior node.

The analogous matrix for the 4-point DST is:

$$\begin{bmatrix} 0 & 0 & 0 & 0 \\ 0 & 1/\sqrt{2} & 1 & 1/\sqrt{2} \\ 0 & 1 & 0 & -1 \\ 0 & 1/\sqrt{2} & -1 & 1/\sqrt{2} \\ 0 & 0 & 0 & 0 \\ 0 & -1/\sqrt{2} & 1 & -1/\sqrt{2} \\ 0 & -1 & 0 & 1 \\ 0 & -1/\sqrt{2} & -1 & -1/\sqrt{2} \end{bmatrix}$$

Figure 2B:
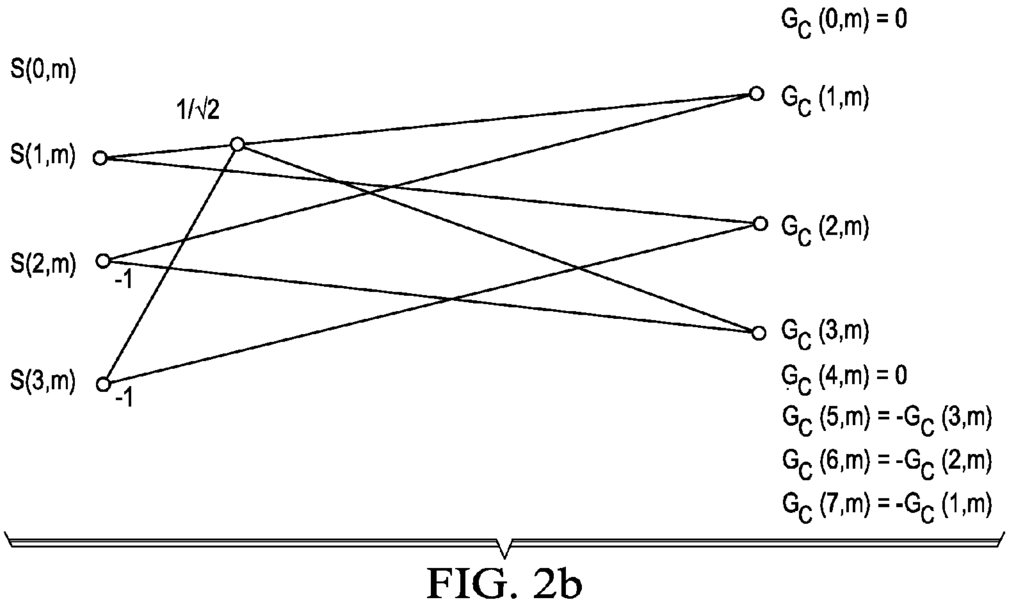

Thus the DST requires a total of 56 additions (counting sign inversion as an addition) and 8 multiplications to compute all 64 of the $G_s(q, m)$. FIG. 2*b* is the butterfly diagram.

The multiplications of the $G_c(q, m)$ and $G_s(q, m)$ by sin[(q+16)(2m+1)π/64] and cos[(q+16)(2m+1)π/64] to form $G_{cc}(q, m)$, $G_{cs}(q, m)$, $G_{sc}(q, m)$, and $G_{ss}(q, m)$ generally consumes 256 multiplications, although $G_s(q, m)=0$ for q=0 or 4.

The 8-point DCT matrix has elements with values one of 0, ±1, ±1/√2, ±cos[π/8], or ±cos[3π/8] and is anti-symmetric about the middle row. Therefore, the total computational requirement for the transform is 248 additions and 40 multiplications.

The 8-point DST is analogous to the 8-point DCT; its 8×8 matrix has elements with values one of 0, ±1, ±1/√2, ±sin[π/8], or ±sin[3π/8] and is symmetric about the middle row. Therefore, the total computational requirement for the transform is 224 additions and 40 multiplications. Of course, sin[π/8]=cos[3π/8] and sin[3π/8]=cos[π/8].

The following table compares the second preferred embodiment and the MPEG standard computational complexities and memory requirements.

| | MPEG standard | preferred embodiment |
|---|---|---|
| multiplications | 1088 | 352 |
| additions | 1088 | 872 |
| memory (words) | 1088 | 296 |

5. Modifications

The preferred embodiments can be modified while retaining the feature of decomposition of the synthesis filter bank matrixing into lower memory-demand computations.

For example, the 8-point DCT further factors into 4-point DCT and DST together with 2-point DCT and DST, although the memory reduction and complexity decrease are minimal.

Alternatively, the 32 subbands could be changed to K/2 subbands for K an integer which factors as K=QM. In this case the factoring of the matrix multiplication analogous to the preferred embodiments can be performed. Indeed, for matrix elements $N_{i,k}=\cos[(i+z)(2k+1)\pi/K]$ for the range i=0, 1, . . . , K−1, and k=0, 1, . . . , K/2−1, together with z equal to a multiple of Q, again change the summation to iterated sums by index change and apply the cosine angle addition formula twice to factor (and thus simplify) the computations. In particular, let i=Qp+q and k=Mn+m with q=0, . . . , Q−1; p=0,1, . . . , M−1; m=0, 1, . . . , M−1; and n=0, . . . , Q/2−1. The matrix multiplication becomes:

$$\begin{aligned} V(p,q) &= \sum_{0\le k\le K/2-1} N(i,k)S(k) \\ &= \sum_{0\le k\le K/2-1} \cos[(i+z)(2k+1)\pi/K]S(k) \\ &= \sum_{0\le m\le M-1}\ \sum_{0\le n\le Q/2-1} \cos[(Qp+q+z)(2Mn+2m+1)\pi/K] \\ &\quad S(nM+m) \end{aligned}$$

Again, multiply out the cosine argument, then use QM/K=1 and zM/K equals an integer to drop terms that are multiples of 2π, and lastly use the cosine angle addition formula to get factors cos[qnM2π/K] and sin[qnM2π/K] plus cos[p(2m+1)π/M+(q+z)(2m+1)π/K] and sin[p(2m+1)π/M+(q+z)(2m+1)π/K]. As previously, the summations over n can be performed and correspond to transforms “Q/2-point DCT” and “Q/2-point DST”. Then again define $G_c$(q, m) and $G_s$(q, m). Next, again apply the sine and cosine angle addition formulas to the cos[p(2m+1)π/M+(q+z)(2m+1)π/K] and sin[p(2m+1)π/M+(q+z)(2m+1)π/K] to have the factors cos[p(2m+1)π/M], sin[p(2m+1)π/M], cos[(q+z)(2m+1)π/K], cos[(q+z)(2m+1)π/K]. Again do the multiplications of $G_c$(q, m) and $G_s$(q, m) with cos[(q+z)(2m+1)π/K] and sin[(q+z)(2m+1)π/K] to get $G_{cc}$(q, m), $G_{cs}$(q, m), $G_{sc}$(q, m), and $G_{ss}$(q, m). And lastly, again do the sums over m which correspond to transforms “M-point DCT” and “M-point DST”. The FIG. 1 flow remains the same. And the Q/2-point and M-point transforms can be analyzed analogously to FIGS. 2*a*-2*b* and may be simplified for memory and computation.

What is claimed is:

1. A method of filter bank operation, comprising the steps of:

(a) receiving a block of subband coefficients $S_0, S_1, \ldots, S_{K/2-1}$ where K is an even integer which factors as K=MQ with M and Q integers;

(b) effecting a matrix multiplication $V_i=\Sigma_{0\le k\le K/2-1} N_{i,k} S_k$, for i=0, 1, . . . , K−1, where the matrix elements are $N_{i,k}=\cos[(i+z)(2k+1)\pi/K]$ with z an integer multiple of Q; and (c) wherein said matrix multiplication implementation includes:

(i) for an mth subblock of said block where m=0, 1, . . . , M−1, applying a cosine transform to give outputs Gc(q,m) with q=0, 1, . . . , Q−1;

(ii) for said mth subblock, applying a sine transform to give outputs Gs(q,m) with q=0, 1, . . . , Q−1;

(iii) applying a cosine transform with respect to the index m to a linear combination of said Gc(q,m) and Gs(q,m) with coefficients cos[(q+z)(2m+1)π/K] and −sin[(q+z)(2m+1)π/K]; and (iv) applying a sine transform with respect to the index m to a linear combination of said Gc(q,m) and Gs(q,m) with coefficients −sin[(q+z)(2m+1)π/K] and −cos[(q+z)(2m+1)π/K].

2. The method of claim 1, wherein:

(a) M=8;

(b) Q=8; and (c) z=16.

3. A synthesis filter bank, comprising:

(a) circuitry operable to receive a block of subband coefficients $S_0, S_1, \ldots, S_{31}$ and effect a matrix multiplication $V_i=\Sigma_{0\le k\le 31} N_{i,k} S_k$, for i=0, 1, . . . , 63, where the matrix elements are $N_{i,k}=\cos[(i+16)(2k+1)\pi/64]$, and wherein said matrix multiplication implementation includes:

(i) for an mth subblock of said block where m=0, 1, . . . , 7, application of a 4-point cosine transform to give outputs Gc(q,m) with q=0, 1, . . . , 7;

(ii) for said mth subblock, application of a 4-point sine transform to give outputs Gs(q,m) with q=0, 1, . . . , 7;

(iii) application of an 8-point cosine transform with respect to the index m to the linear combination cos[(q+16)(2m+1)π/64] Gc(q,m)−sin[(q+16)(2m+1)π/64] Gs(q,m); and (iv) application of an 8-point sine transform with respect to the index m to the linear combination sin[(q+16)(2m+1)π/64] Gc(q,m)+cos[(q+16)(2m+1)π/64] Gs(q,m).

4. The synthesis filter bank of claim 3, wherein:

(a) said circuitry includes a programmable processor; and (b) memory coupled to said processor and sufficient to store both sines and cosines for said 4-point and 8-point transforms plus numerical variables.

5. The synthesis filter bank of claim 4, wherein:

(a) said memory has at most 296 words.

6. A method of filter bank operation, comprising the steps of:

(a) receiving a block of subband coefficients $S_0, S_1, \ldots, S_{31}$;

(b) effecting a matrix multiplication $V_i=\Sigma_{0\le k\le 31} N_{i,k} S_k$, for i=0, 1, . . . , 63, where the matrix elements are $N_{i,k}=\cos[(i+16)(2k+1)\pi/64]$; and (c) wherein said matrix multiplication implementation includes:

(i) for an mth subblock of said block where m=0, 1, . . . , 7, applying a 4-point cosine transform to give outputs Gc(q,m) with q=0, 1, . . . , 7;

(ii) for said mth subblock, applying a 4-point sine transform to give outputs Gs(q,m) with q=0, 1, . . . , 7;

(iii) applying an 8-point cosine transform with respect to the index m to the linear combination cos[(q+16)(2m+1)π/64] Gc(q,m)−sin[(q+16)(2m+1)π/64] Gs(q,m); and (iv) applying an 8-point sine transform with respect to the index m to the linear combination sin[(q+16)(2m+1)π/64] Gc(q,m)+cos[(q+16)(2m+1)π/64] Gs(q,m).

7. The method of claim 6, wherein:

(a) said 4-point cosine transform has the structure illustrated in FIG. 2*a*; and (b) said 4-point sine transform has the structure illustrated in FIG. 2*b*.

8. The method of claim 1, wherein the matrix multiplication of $V_i$ for i=0, 1, 2, . . . , 63 results in k/2 outputs.

9. The method of claim 6, wherein the matrix multiplication of $V_i$ for i=0, 1, 2, . . . , 63 results in k/2 outputs.

* * * * *